United States Patent [19]

Blair

[11] Patent Number: 4,916,728

[45] Date of Patent: Apr. 10, 1990

[54] CELLULAR TELEPHONE UNIT WITH PRIORITIZED FREQUENCY ACQUISITION

[75] Inventor: Kevin B. Blair, Spring, Tex.

[73] Assignee: GTE Mobilnet Incorporated, Houston, Tex.

[21] Appl. No.: 223,865

[22] Filed: Jul. 25, 1988

[51] Int. Cl.⁴ .............................................. H01Q 7/04
[52] U.S. Cl. .................................... 379/59; 455/33
[58] Field of Search ............... 379/62, 59, 60, 63; 455/33

[56] References Cited

U.S. PATENT DOCUMENTS

| | | | |
|---|---|---|---|
| 4,573,206 | 2/1986 | Grauel et al. | 455/33 |
| 4,669,107 | 5/1987 | Eriksson-Lennartsson | 379/60 |
| 4,679,225 | 7/1987 | Higashiyama | 379/62 |
| 4,727,568 | 2/1988 | Morishima | 379/58 |
| 4,742,560 | 5/1988 | Arai | 455/33 |
| 4,747,101 | 5/1988 | Akiwa et al. | 370/95 |
| 4,748,655 | 5/1988 | Thrower et al. | 379/60 |
| 4,750,198 | 6/1988 | Harper | 379/59 |
| 4,771,448 | 9/1988 | Koohgoli et al. | 379/60 |
| 4,833,701 | 5/1989 | Comroe et al. | 379/60 |
| 4,833,702 | 5/1989 | Shitara et al. | 379/60 |

Primary Examiner—Robert Lev

[57] ABSTRACT

A cellular telephone unit includes selective carrier signal acquisition. Priority of acquisition is given to carrier signals associated with home system identification codes (SIDs), then to any carrier signal associated with a non-excluded SID. Any attempt to dial an emergency call (e.g., a 911 call) overrides any lockout of excluded SIDs. A display such as "roam" and "no service" lights is used selectively to indicate to the user the availability of home and/or non-excluded carrier signals.

7 Claims, 3 Drawing Sheets

| WHEN: SID ON HOME FREQ'S. IS | AND: SID ON NON-HOME FREQ'S. IS | THEN: STATUS DISPLAY IS |
|---|---|---|
| HOME SID | NO SID OR NEG. SID OR NON-NEG. SID | NO LIGHTS (AVAIL FOR USE) |
| NON-HOME AND NON-NEG. SID | NO SID OR NEG. SID OR NON-NEG. | STEADY ROAM LIGHT |
| NO SID OR NEG. SID | NON-HOME AND NON-NEG. SID | BLINKING ROAM LIGHT |
| NO SID OR NEG. SID.(*) | NO SID OR NEG. SID (*) | NO-SERVICE LIGHT |

(*) WHEN "NO-SERVICE" LIGHT IS CAUSED BY NEG. SID, EMERGENCY (911) CALLS OVERRIDE LOCKOUT

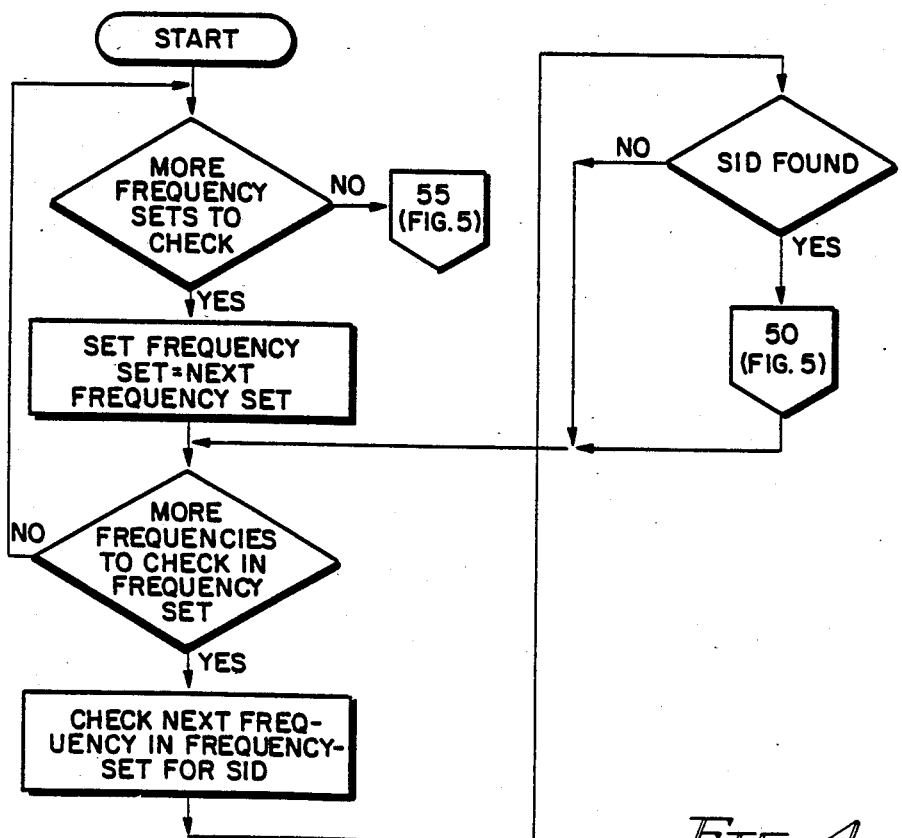

LOOK ONTO FIRST NON-NEGATIVE SID

CELLULAR TELEPHONE UNIT WITH PRIORITIZED FREQUENCY ACQUISITION

BACKGROUND OF THE INVENTION

This invention relates to telephones used in connection with, e.g., cellular telephone systems. In particular, it pertains to the selective enablement and disablement of specific sets of frequencies while a telephone is physically "roaming" among service areas, with an override for emergency numbers such as 911.

Two concepts are of particular pertinence to the invention: the home frequency set of a given telephone unit, and the home system identification code, or SID, of the unit.

Home Frequency Set

The home frequency set relates to the two sets of cellular telephone frequencies that generally exist for each city having cellular telephone service. By FCC rule, when a city or other service area first gets cellular service, the so-called A frequencies are initially reserved for nonwireline service companies, while the B frequencies are initially reserved for wireline service companies. (These frequency allocations are not necessarily permanent.)

Each frequency set in a given cellular service area is assigned to one-and only one service company. However, in different service areas the same frequency set may be assigned to different service companies (much as a television channel may be assigned to an affiliate of one network in one city and to an affiliate of another network in another city).

The home frequency set of a given telephone unit is the set of frequencies which the unit will ordinarily attempt to use. It will depend in large part on which service company is subscribed to by the telephone unit's user: if the user is a subscriber of a nonwireline service company, the user's home frequency set will be the A frequencies, and vice versa.

As will be familiar to those of ordinary skill, a frequency set typically includes paging channels and associated signalling channels, as well as voice channels. The paging and signalling channels are used for preliminary coded communications between a cellular telephone and a cell site in setting up a telephone call, after which a voice channel is assigned for the telephone's use on that call.

Home SID on Paging Channels

Each service company broadcasts a unique system identification code (SID) on all paging channels of the frequency sets on which it provides service in a given service area. A suitably equipped cellular telephone can thus determine which service company is providing service on a given paging channel by identifying the SID.

Receipt of a home SID is not necessarily required to be able to place a call. Many service companies have reciprocal billing arrangements with one another, meaning that a call can be placed on a frequency associated with a non-home cellular system. However, use of a non-home service company in this manner to place a call may result in the imposition of a surcharge (e.g., a fixed surcharge or a higher per-unit rate).

Furthermore, if the non-home service company does not have a reciprocal billing arrangement with the user's home service company, as a practical matter the user may not be able to place a call at all. Even though the telephone unit is capable of establishing a connection via the carrier signal, the non-home service company's switching equipment typically will not allow the user to do anything with the connection without a way to bill the user for his or her usage. Some service companies automatically switch calls of this kind to an operator who, e.g., can take down a credit card number; absent a billing arrangement of some kind, however, no call can be completed.

Convention for Roam and No-Service Lights

Cellular telephones typically include status indication displays such as status lights. The "roam" light indicates that the telephone has detected a non-home SID on a carrier signal and can make at least a connection with that company's service via the carrier signal. The "no-service" light indicates that no cellular connections are available.

SUMMARY OF THE INVENTION

In accordance with the present invention, a cellular telephone unit is programmed to scan the available cellular frequencies in search of a home SID carrier signal, or alternatively for a carrier signal associated with an SID that is not on an exclusion list, and to indicate the availability of carrier signals on a status display. A 911 override is provided to allow dialing of emergency numbers no matter what the home-SID status.

BRIEF DESCRIPTION OF THE DRAWINGS

FIG. 3 is a chart, in truth-table format, of the status-light configuration of a telephone unit in accordance with the invention upon the occurrence of combinations of events represented in the chart.

FIGS. 4 and 5 depict a flow chart of logical operations programmed for execution by the telephone to determine which of the states represented by the chart is in existence.

Throughout the following detailed description, similar reference numerals refer to similar elements in all Figures of the drawings.

DETAILED DESCRIPTION OF SPECIFIC EMBODIMENTS

An illustrative implementation of a microprocessor-based telephone system in accordance with the invention is presented here. The illustration uses an automobile cellular phone as an example, but it will be understood by those of ordinary skill that the invention can be implemented in virtually any telecommunications system.

Telephone Linked to MTSO

Figure 1:
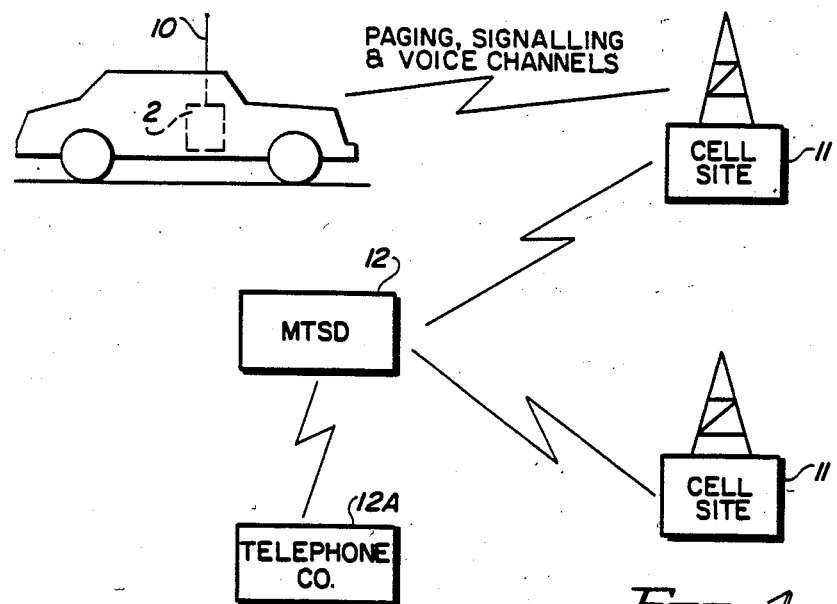
FIG. 1 is block diagram of a typical mobile cellular telephone and its link with a fixed switching unit.
Figure 2:
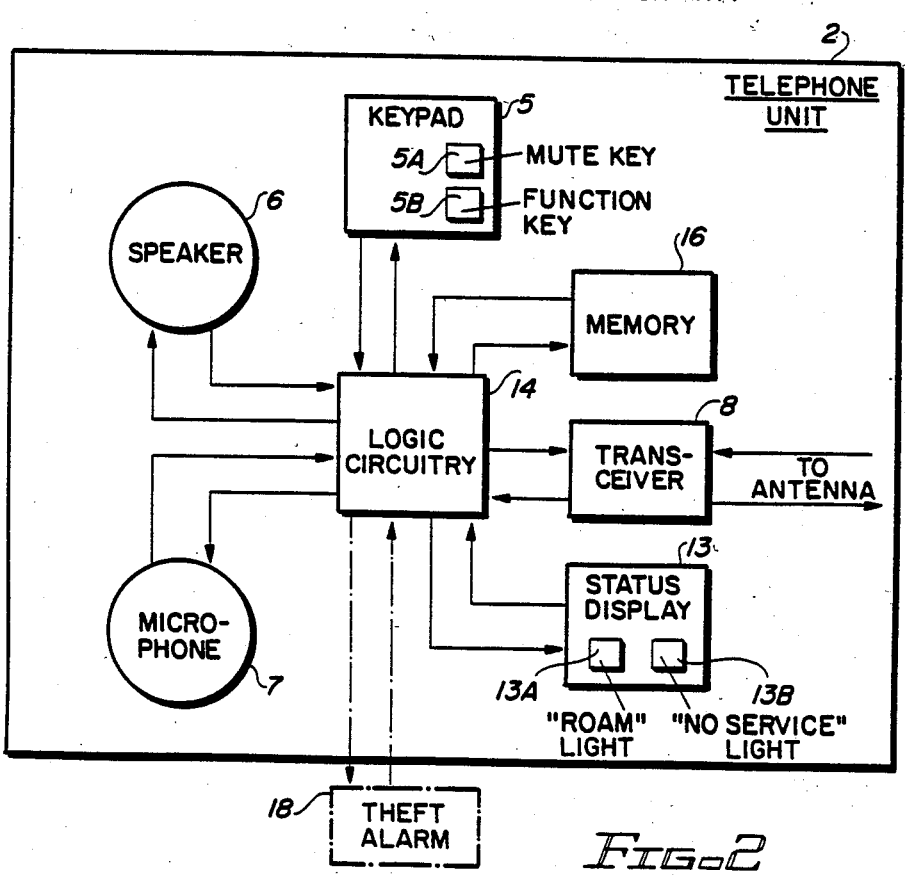
FIG. 2 is a block diagram of some components of such a telephone.

FIGS. 1 and 2 show a typical automobile cellular telephone unit 2 having a unique mobile identification number (MID) stored in a suitable location such as an electrically eraseable programmable read-only memory (EEPROM, not shown). Telephone units of this kind ar well known in the art and are described here only in sufficient detail to aid understanding the invention.

The telephone unit 2 includes a handset 4 having a keypad 5; equivalently, the keypad 5 could be located separately from the handset. Also included in the telephone unit 2 are a speaker 6 and a microphone 7, shown as being mounted within the handset 4 but either or both of which could equivalently be mounted apart from the handset, either separately (e.g., in a telephone operator's headset or in wall mountings), or approximately together (e.g., in a walkie-talkie or speakerphone configuration). It will be apparent to those of ordinary skill that if the keypad 5, the speaker 6, and the microphone 7 are all located apart from the handset 4, the handset can be dispensed with.

A transceiver 8, ordinarily built into the telephone unit 2, exchanges signals (via, e.g., an antenna 10) with a mobile telecommunications switching office (MTSO) 12, typically via radiotelephone signals relayed by one of several cell sites 11 that are in turn connected with the MTSO 12 via a landline. The MTSO 12 is ordinarily connected with a telephone company switching unit 12a via a high-capacity landline or similar connection.

Status Display and Logic Circuitry

A status display 13 shows the status of the telephone unit 2. The status display 13 typically includes a NO SVC indicator to show that no cellular telephone service is available; and a ROAM indicator to show that the telephone unit 2 is outside its usual service area.

The transceiver 8 and antenna 10 are shown as being separate from the handset 4, but either or both could equivalently be built into the handset. The MTSO 12 could equivalently be another telephone or similar unit if both telephones had appropriate signalling, switching, and call processing capabilities.

Those of ordinary skill having the benefit of this disclosure will appreciate that the signal exchange may utilize any of a wide variety of transmission systems that are equivalent for purposes of this description. These include, for example, radio, electrical-type wire (such as telephone landlines), modulation of light beams (e.g., in fiberoptic networks or laser beams), and so forth. The signal exchange may use one or more of these media alone or equivalently in combination. Whether specific components such as the antenna 10 are needed for a given implementation of the invention will depend in part on the transmission system selected for implementation.

The operation of the telephone unit 2 is controlled by logic circuitry 14. The logic circuitry 14 may be implemented in the form of, e.g., a microprocessor which executes program statements stored in a storage device such as a read-only memory, or equivalently by discrete logic components or one or more custom semiconductor chips.

Those of ordinary skill will appreciate that a sequence of numbers to be dialed by the telephone unit 2 is processed by the logic circuitry 14 generally as follows, both in the prior art and in connection with the invention. Under control of the logic circuitry 14, the transceiver 8 transmits a cellular control signal to a cell site 11 over a signalling channel. The control signal includes a request that the MTSO 12 dial a specified telephone number and assign a voice frequency or channel for use by the telephone unit 2.

The telephone unit 2 includes a read-write memory 16, accessible to the user and whose contents will not be affected by telephone power-downs of ordinary duration. For example, the memory 16 may equivalently comprise an EEPROM programmable by the user, a CMOS memory chip, or a conventional RAM with an independent power supply, any of which may possibly be implemented as part of a custom semiconductor chip.

It will be understood that telephones used in typical cellular systems are capable of generating both dual tone multi-frequency (DTMF) signals (DTMF signals produced by Bell telephones are referred to by the "Touch-Tone" trademark) and EIA standard IS-3-D cellular control signals.

A theft alarm 18 is shown in phantom as being connected by way of example to the transceiver 8. The theft alarm 18 may be of a variety of types well known to those of skill, e.g., an automatic-dialing type, one which sounds the car's horn (and thus need not be connected to the transceiver 8), etc. The theft alarm 18 forms no part of the invention and is shown in the drawings for purposes of clarity.

It will be understood by those of ordinary skill having the benefit of this disclosure that the specific details of any given implementation may vary considerably depending on the particular microprocessor or other components selected. The selection of components and the arrangement and programming thereof will be a matter of choice by the artisan for the particular application desired.

Prioritized Frequency Acquisition

The logic circuitry 14 is programmed to seek to avoid (except in emergencies) "negative" SIDs on a preprogrammed list of such SIDs. A negative SID may be, e.g., one representing a service company with whom the user's home service company does not have a reciprocal billing arrangement. The logic circuitry 14 is also programmed to actuate the status display 13 to reflect the SIDs currently available to the user of the telephone unit 2.

The logic circuitry 14 includes conventional programming to permit a service technician to enter one or more negative SIDs, or equivalently one or more "good" SIDs, into the memory 16. Such programming is well known to those of ordinary skill and is not shown in the drawings.

Turning to FIG. 3, a truth table of possible SID availability states, and a possible display associated with each such state, is shown. The display in this embodiment comprises selective illumination of the "roam" and "no-service" lights, but equivalent displays, such as dedicated status lights for each state or use of liquid crystal display (LCD) devices in lieu of lights, can easily be implemented by those of ordinary skill.

As shown in the third column of the truth table, darkened status lights 13A and 13B indicate that the telephone unit 2 detects a home SID (on a home frequency), and that the telephone unit 2 is available for use. A steady "roam" light 13A and a dark "no service" light 9B indicate that a nonhome, nonnegative SID has been detected on a home frequency, and thus that a connection can be established with the SID.

One possible status display configuration will be described here. A blinking "roam" light 13A and a dark "no service" light 13B indicate that a nonhome, nonnegative SID has been detected on a nonhome frequency, and that a connection can be thus established. An illuminated "no service" light 13B indicates either that no SID has been detected at all, or that any SID detected is a negative SID; with one exception, the telephone unit 2 is thus unable to initiate a call. The exception is that the logic circuitry 14 will attempt to initiate an emergency (e.g., 911) call whenever such a call dialed if any SID is detected.

Figure 5:
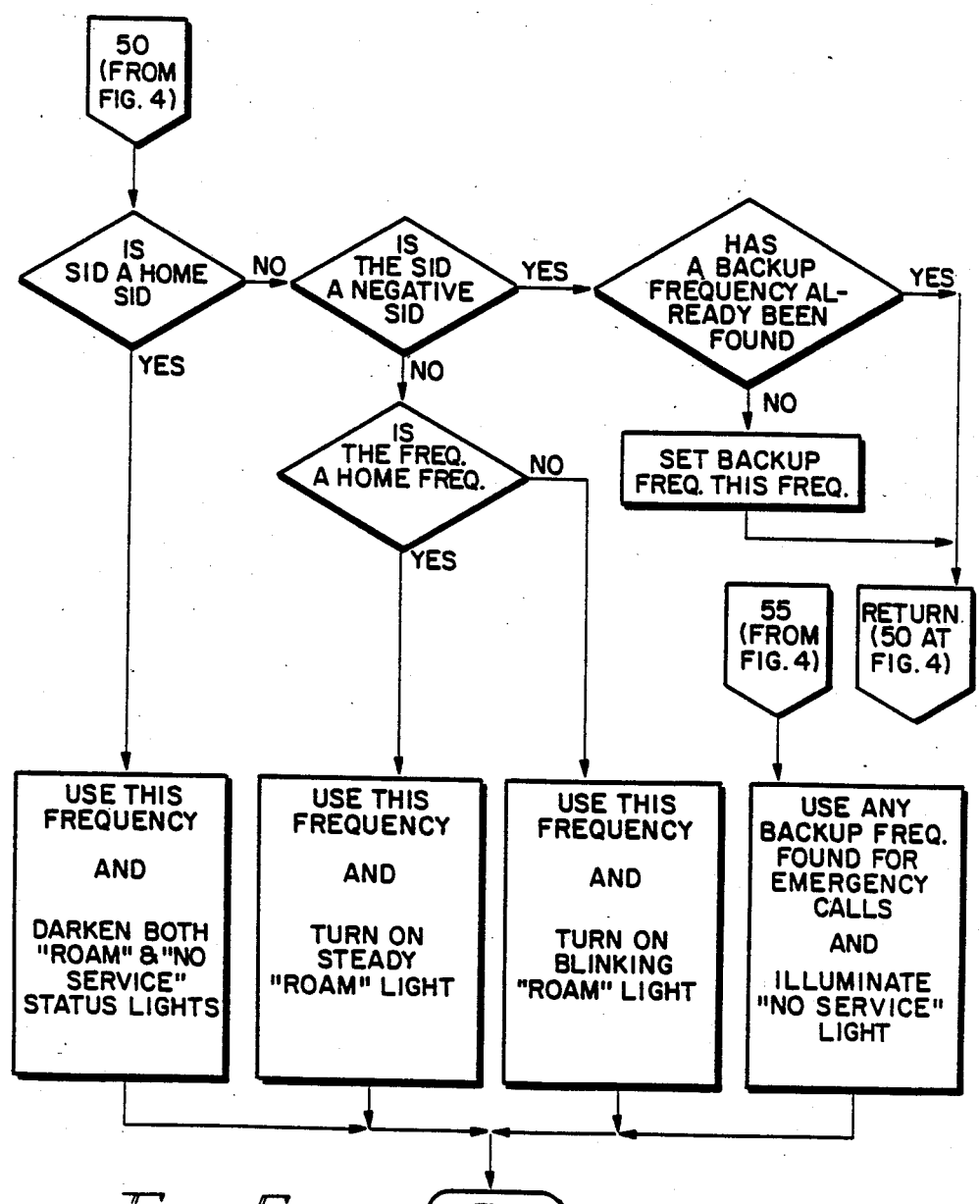

FIG. 4 and 5 depict a simple, mixed depth-first-then-breadth sequence of search operations to be performed under the control of the logic circuitry 14 by which the A and B frequencies can be scanned in search of a suitable nonnegative SID. As shown in the Figures, the logic circuitry 14 is programmed in this embodiment to scan all home frequencies first, then all nonhome frequencies, but to acquire or lock onto the frequency of the home system, if available, otherwise, the frequency corresponding to the first nonnegative SID found.

It will of course be recognized by those of ordinary skill that the sequences shown are merely exemplary. Many possible equivalent sequences of search operations may be utilized to ascertain the present SID state and actuate an appropriate status display corresponding to that state.

For example, the logic circuitry 14 could be programmed for a breadth-first search, i.e., to scan both home frequencies and nonhome frequencies in search of a home SID, then to rescan in search of any nonnegative SID. As a depth-first example, the home frequencies could be scanned for a home SID, then rescanned for a nonhome SID; following which the nonhome frequencies could be scanned for a nonnegative SID.

It is preferable in all cases to a provide a 911 override wherein the logic circuitry 14 is programmed so that if the user attempts to dial a specified emergency number, the telephone unit 2 will scan for and lock onto the first available SID, whether or not a negative SID, nonhome frequency, etc. The specified emergency number may be hardwired into the logic circuitry 14, or may be user programmable into the memory 16, or a default value such as 911 may be so hardwired for use in the absence of a user-programmed value.

The actual details of programming the logic circuitry 14 to perform the sequence of operations will vary considerably with the specific hardware used for imiplementation of the telephone unit 2. Variations in the specific implementation of any given search strategy may be desirable, e.g., to take advantage of special features of particular hardware.

It will be appreciated by those skilled in the art having the benefit of this disclosure that this invention is believed to be capable of application in other situations in which the hardware and software work in substantially the same way to achieve essentially the same result. Some of these situations have been expressly described here (as examples and not as limitations), and others will be recognized by those of skill. Accordingly, this description is to be construed as illustrative only and as for the purpose of teaching those skilled in the art the manner of carrying out the invention.

It is also to be understood that various modifications and changes may be made, e.g., in the shape, size, and arrangement of components, operating steps, and so forth, without departing from the spirit and scope of the invention as set forth below in the claims. It is intended that the following claims be interpreted to embrace all such modifications and changes.

What is claimed is:

1. A cellular telephone unit with control logic circuit means including:
    scanning means for scanning a plurality of frequencies to identify a home SID signal,
    means responsive to said scanning means, in the absence of a home SID signal, for alternatively scanning for any nonnegative SID,
    means for acquiring a carrier signal corresponding to an SID signal found by said scanning means, and
    means for activating a display indicating the availability of any SID so found.

2. A cellular telephone unit including:
    scanning means for sequentially monitoring a plurality of frequencies;
    detection means for detecting any SID that is present on any said frequency that is monitored by said scanning means;
    frequency selection means for selecting as a working frequency the frequency corresponding to a home SID if said home SID is detected by said detection means, and for selecting as a working frequency the frequency corresponding to a nonhome, nonnegative SID if such an SID is detected by said detection means and a home SID is not detected by said detection means; and
    display means for displaying a frequency selection status corresponding to any said frequency selected by said frequency selection means.

3. A cellular telephone unit comprising:
    scanning means for sequentially monitoring a plurality of frequencies and for detecting any SID corresponding to any said frequency;
    frequency selection means for selecting a working frequency from among said plurality of frequencies;
    a roam status indicator and a no-service status indicator;
    frequency selection control means for controlling the selection by said frequency selection means of a working frequency,
    said working frequency being a frequency corresponding to a home SID if said home SID is detected by said scanning means, and
    said working frequency being a frequency corresponding to a nonnegative SID if such an SID is detected by said scanning means and a home SID is not detected by said scanning means, and
    said working frequency being a frequency corresponding to a negative SID if no nonnegative SID is detected by said scanning means; and
    display control means for controlling said roam status indicator and said no-service status indicator, whereby:
    if said frequency selection control means selects a working frequency that corresponds to a home SID, neither of said status indicators is activated,
    if said frequency selection control means selects a working frequency that corresponds to a nonnegative, nonhome SID and that is a home frequency, said roam status indicator is continuously activated,
    if said frequency selection control means selects a working frequency that corresponds to a nonnegative, nonhome SID and that is a nonhome frequency, said roam status indicator is intermittently activated, and
    if said frequency selection control means selects a working frequency corresponding to a negative SID, neither of said status indicators is activated.

4. Logic circuitry for control of a cellular telephone unit, said telephone unit including:

scanning means for sequentially monitoring a plurality of frequencies and for detecting any SID corresponding to any said frequency, frequency selection means for selecting a working frequency from among said plurality of frequencies, a roam status indicator and a no-service status indicator, said logic circuitry comprising:

frequency selection control means for controlling the selection by said frequency selection means of a working frequency, said working frequency being a frequency corresponding to a home SID if said home SID is detected by said scanning means, and said working frequency being a frequency corresponding to a nonnegative SID if such an SID is detected by said scanning means and a home SID is not detected by said scanning means, and said working frequency being a frequency corresponding to a negative SID if no nonnegative SID is detected by said scanning means; and display control means for controlling said roam status indicator and said no-service status indicator, whereby:

if said frequency selection control means selects a working frequency that corresponds to a home SID, neither of said status indicators is activated, if said frequency selection control means selects a working frequency that corresponds to a nonnegative, nonhome SID and that is a home frequency, said roam status indicator is continuously activated, if said frequency selection control means selects a working frequency that corresponds to a nonnegative, nonhome SID and that is a nonhome frequency, said roam status indicator is intermittently activated, and if said frequency selection control means selects a working frequency corresponding to a negative SID, neither of said status indicators is activated.

5. A method for displaying the availability of carrier signals associated respectively with a home SID, a nonhome, nonnegative SID on a home frequency, a nonhome, nonnegative SID on a nonhome frequency, and a negative SID, comprising the steps of:

if a carrier signal is available that corresponds to a home SID, then activating neither a roam status indicator nor a no-service indicator;

else if a carrier signal is available that corresponds to a nonhome, nonnegative SID on a home frequency, then continuously activating said roam status indicator;

else if a carrier signal is available that corresponds to a nonhome, nonnegative SID on a nonhome frequency, then intermittently activating said roam status indicator;

else if a carrier signal is available that corresponds to to a negative SID, then activating said no-service indicator.

6. A cellular telephone unit comprising:

scanning means for sequentially monitoring a plurality of frequencies and for detecting any SID corresponding to any said frequency;

frequency selection means for selecting a working frequency from among said plurality of frequencies;

frequency selection control means for controlling the selection by said frequency selection means of a working frequency;

said working frequency being a frequency corresponding to a home SID if said home SID is detected by said scanning means, and said working frequency being a frequency corresponding to a nonnegative SID if such an SID is detected by said scanning means and a home SID is not detected by said scanning means, and said working frequency being a frequency corresponding to a negative SID if:

(i) no home SID is detected by said scanning means, and (ii) no nonnegative SID is detected by said scanning means, and (iii) a user dials a predetermined number.

7. A cellular telephone unit as defined in claim 6 wherein the predetermined number is an emergency number.

* * * * *